(12) United States Patent
Salm et al.

(10) Patent No.: US 9,567,860 B2
(45) Date of Patent: Feb. 14, 2017

(54) FIXTURE FOR AN AIRFOIL SHROUD AND METHOD FOR MODIFYING AN AIRFOIL SHROUD

(71) Applicant: General Electric Company, Schenectady, NY (US)

(72) Inventors: Jacob Andrew Salm, Simpsonville, SC (US); James Ryan Connor, Greenville, SC (US); John David Ward, Jr., Woodruff, SC (US)

(73) Assignee: General Electric Company, Schenectady, NY (US)

( * ) Notice: Subject to any disclaimer, the term of this patent is extended or adjusted under 35 U.S.C. 154(b) by 1107 days.

(21) Appl. No.: 13/685,943

(22) Filed: Nov. 27, 2012

(65) Prior Publication Data

US 2014/0147285 A1    May 29, 2014

(51) Int. Cl.
| | | |
|---|---|---|
| *B25B 11/00* | (2006.01) | |
| *F01D 5/22* | (2006.01) | |
| *B23P 6/00* | (2006.01) | |
| *F01D 5/00* | (2006.01) | |

(52) U.S. Cl.
CPC .............. *F01D 5/225* (2013.01); *B23P 6/002* (2013.01); *F01D 5/005* (2013.01); *F05D 2260/94* (2013.01); *F05D 2270/332* (2013.01); *Y10T 29/49318* (2015.01)

(58) Field of Classification Search
CPC ............. B25B 11/002; B25B 1/00; B25B 5/00
See application file for complete search history.

(56) References Cited

U.S. PATENT DOCUMENTS

| | | | |
|---|---|---|---|
| 2,977,533 A | 3/1961 | Savage | |
| 4,445,678 A * | 5/1984 | George | B23Q 3/104 |
| | | | 269/282 |
| 5,133,643 A | 7/1992 | Ortolano | |
| 5,162,659 A | 11/1992 | Diamond et al. | |
| 6,701,616 B2 | 3/2004 | Smith et al. | |
| 6,792,655 B2 | 9/2004 | Wah | |
| 6,842,995 B2 | 1/2005 | Jones et al. | |
| 6,906,808 B2 | 6/2005 | Trantow et al. | |
| 6,910,278 B2 | 6/2005 | Holder | |
| 7,024,787 B2 | 4/2006 | Varsell et al. | |
| 7,328,496 B2 | 2/2008 | Powers et al. | |
| 7,337,520 B2 | 3/2008 | Jones et al. | |

(Continued)

FOREIGN PATENT DOCUMENTS

| | | |
|---|---|---|
| CN | 1883872 A1 | 12/2006 |
| EP | 1785583 A3 | 6/2010 |

*Primary Examiner* — Lee D Wilson
(74) *Attorney, Agent, or Firm* — Ernest G. Cusick; Frank A. Landgraff (57) ABSTRACT

According to one aspect, a fixture for an airfoil shroud having a first end edge, a second end edge, a leading edge, a trailing edge, a radially outer side and a radially inner side with respect to a rotor axis of a bucket having the airfoil shroud is provided. The fixture includes a base plate, a first member extending from the base plate configured to locate and abut the first end edge, a second member extending from the base plate configured to locate and abut a side of a seal rail, a third member extending from the base plate configured to locate and abut the radially outer side of the airfoil shroud and a template recess formed in the base plate proximate the first end edge to define a geometry of a relief cut in the trailing edge of the airfoil shroud.

18 Claims, 8 Drawing Sheets

(56) References Cited

U.S. PATENT DOCUMENTS

| | | |
|---|---|---|
| 7,412,780 B2 | 8/2008 | Holder |
| 7,762,004 B2 | 7/2010 | Sherlock et al. |
| 2009/0064520 A1 | 3/2009 | Sherlock et al. |
| 2011/0167635 A1 | 7/2011 | Milleville |
| 2014/0147285 A1* | 5/2014 | Salm ................. F01D 5/005 |
| | | 416/204 R |

* cited by examiner

FIXTURE FOR AN AIRFOIL SHROUD AND METHOD FOR MODIFYING AN AIRFOIL SHROUD

BACKGROUND OF THE INVENTION

The subject matter disclosed herein relates to turbine engines. More particularly, the subject matter relates to modifying of turbine engine parts.

In a gas turbine engine, a compressor provides pressurized air to one or more combustors wherein the air is mixed with fuel and burned to generate hot combustion gas. These gases flow downstream to one or more turbines that extract energy therefrom to produce a mechanical energy output as well as power to drive the compressor. Over time, gas turbine engine parts may experience fatigue, due to extreme conditions within the turbine, including high temperatures and pressures caused by flow of hot gas. In particular, certain turbine parts, such as buckets located on a turbine rotor, may experience fatigue that requires servicing or replacement.

In cases where the part is a complex part that was manufactured using close tolerance, the part can have deformations due to wear and tear. The deformed part can be difficult to fixture for servicing due to a variation in dimension caused by deformation.

BRIEF DESCRIPTION OF THE INVENTION

According to one aspect of the invention, a fixture for an airfoil shroud having a first end edge, a second end edge, a leading edge, a trailing edge, a radially outer side and a radially inner side with respect to a rotor axis of a bucket having the airfoil shroud is provided. In embodiments, the airfoil is a turbine bucket in a rotor section of a turbine engine. The fixture includes a base plate configured to be disposed on one of the radially outer side and radially inner side of the airfoil shroud, a first member extending from the base plate configured to locate and abut the first end edge, wherein the first end edge is proximate a trailing edge of an airfoil of the bucket, a second member extending from the base plate configured to locate and abut a side of a seal rail circumferentially extending from the radially outer side of the airfoil shroud, wherein surfaces of the first end edge and the side of the seal rail are substantially parallel to an axis of the airfoil, a third member extending from the base plate configured to locate and abut the radially outer side of the airfoil shroud and a template recess formed in the base plate proximate the first end edge to define a geometry of a relief cut in the trailing edge of the airfoil shroud.

According to another aspect of the invention, a method for modifying an airfoil shroud of an airfoil having an airfoil axis, the airfoil shroud having a first end edge, a second end edge, a leading edge, a trailing edge, a radially outer side and a radially inner side with respect to a rotor axis of a rotor of the airfoil is provided. The method includes positioning a base plate proximate the airfoil shroud, locating an axial position, with respect to the rotor axis, of the airfoil shroud by abutting a first end edge, wherein the first end edge is proximate a trailing edge of the airfoil shroud, locating a circumferential position, with respect to a circumference of the rotor, of the airfoil shroud by abutting a side of a seal rail circumferentially extending from the radially outer side of the airfoil shroud, wherein surfaces of the first end edge and the side of the seal rail are substantially parallel to the airfoil axis, locating an axial position, with respect to the airfoil axis, by abutting the radially outer side of the airfoil shroud and defining a template for a geometry of a relief cut for the airfoil shroud.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

FIG. 1 is a schematic diagram of an embodiment of a gas turbine system;

FIG. 2 is a side view of an embodiment of an airfoil having a shroud;

FIG. 3 is a top view of the airfoil of FIG. 2;

FIG. 4 is a top view of an embodiment of an airfoil shroud having a flaw;

FIG. 5 is a top view of the airfoil shroud shown in FIG. 4 with a relief cut to repair the flaw;

FIG. 6 is a top view of a fixture used for modifying an airfoil shroud;

FIG. 7 is a sectional view of the fixture shown in FIG. 6; and

FIG. 8 is a flow chart of an exemplary process for modifying an airfoil shroud.

The detailed description explains embodiments of the invention, together with advantages and features, by way of example with reference to the drawings.

DETAILED DESCRIPTION OF THE INVENTION

FIG. 1 is a schematic diagram of an embodiment of a gas turbine system 100. The system 100 includes a compressor 102, a combustor 104, a turbine 106, a shaft 108 and a fuel nozzle 110. In an embodiment, the system 100 may include a plurality of compressors 102, combustors 104, turbines 106, shafts 108 and fuel nozzles 110. As depicted, the compressor 102 and turbine 106 are coupled by the shaft 108. The shaft 108 may be a single shaft or a plurality of shaft segments coupled together to form shaft 108.

In an aspect, the combustor 104 uses liquid and/or gas fuel, such as natural gas or a hydrogen rich synthetic gas, to run the turbine engine. For example, fuel nozzles 110 are in fluid communication with a fuel supply 112 and pressurized air from the compressor 102. The fuel nozzles 110 create an air-fuel mix, and discharge the air-fuel mix into the combustor 104, thereby causing a combustion that creates a hot pressurized exhaust gas. The combustor 104 directs the hot pressurized exhaust gas through a transition piece into a rotor and stator assembly, causing turbine 106 rotation as the gas exits nozzles where the gas is then directed to the buckets or blades. The rotation of the buckets coupled to the rotor in turbine 106 causes the shaft 108 to rotate, thereby compressing the air as it flows into the compressor 102.

In embodiments, a relief cut is formed in a shroud of an airfoil in the turbine engine. In an embodiment, the shroud is positioned on an airfoil such as a turbine bucket or a nozzle. The relief cut is formed to repair the shroud and remove a flaw, such as a crack, that has been identified on the shroud. The flaw may be caused by fatigue from exposure to extreme heat and pressure during turbine engine operation. In an embodiment, the relief cut is formed without welding the shroud, thus reducing incidence of additional fatigue that may be introduced to the shroud by a welding process. In one embodiment, the relief cut provides a structurally sound repair to the airfoil shroud to enable reuse and reinstallation of the airfoil following forming of the relief cut. Accordingly, the repair process provides savings in time and costs when modifying the airfoil.

In embodiments, the repair process uses a fixture to properly locate the relief cut on the airfoil shroud. The fixture locates surfaces and portions of the shroud to provide a template for forming the relief cut in the shroud. In an embodiment, the fixture enables repair of the airfoil without referencing locations on the airfoil or base of the bucket, where portions of the airfoil can deform and move relative to the shroud over time. Thus, by fixturing to the shroud directly, a position of the shroud relative to the fixture is provided to enable accurate placement of the template used for forming the relief cut.

As used herein, "downstream" and "upstream" are terms that indicate a direction relative to the flow of working fluid through the turbine. As such, the term "downstream" refers to a direction that generally corresponds to the direction of the flow of working fluid, and the term "upstream" generally refers to the direction that is opposite of the direction of flow of working fluid. In addition, the terms "leading edge" and "trailing edge" indicate a position of a part relative to the flow of working fluid. Specifically, a leading edge of an airfoil encounters hot gas flow before a trailing edge of the airfoil. The term "radial" refers to movement or position perpendicular to an axis or center line of a reference part or assembly. It may be useful to describe parts that are at differing radial positions with regard to an axis. In this case, if a first component resides closer to the axis than a second component, it may be stated herein that the first component is "radially inward" of the second component. If, on the other hand, the first component resides further from the axis than the second component, it can be stated herein that the first component is "radially outward" or "outboard" of the second component. The term "axial" refers to movement or position parallel to an axis. Finally, the term "circumferential" refers to movement or position around an axis. Although the following discussion primarily focuses on gas turbines, the concepts discussed are not limited to gas turbines and may apply to any suitable rotating machinery, including steam turbines. Accordingly, the discussion herein is directed to gas turbine embodiments, but may apply to steam turbines and other turbomachinery.

Figure 1:
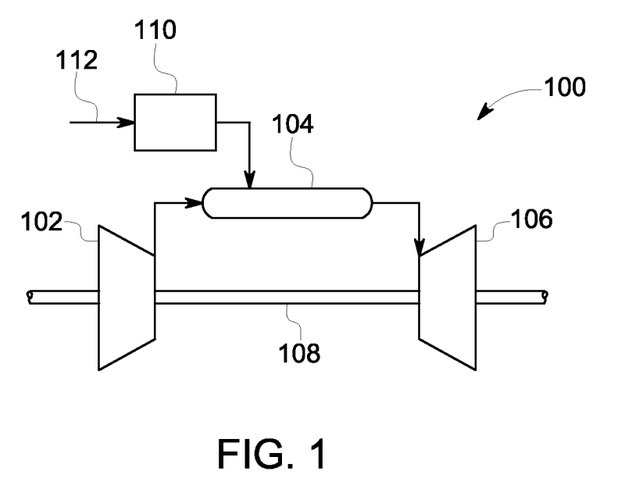
Figure 2:
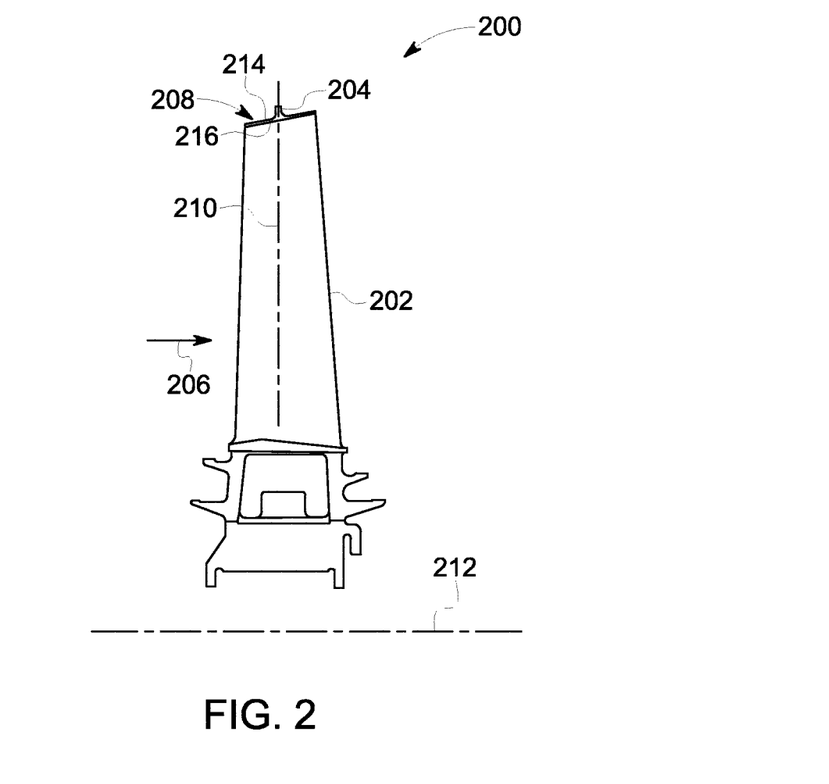
Figure 3:
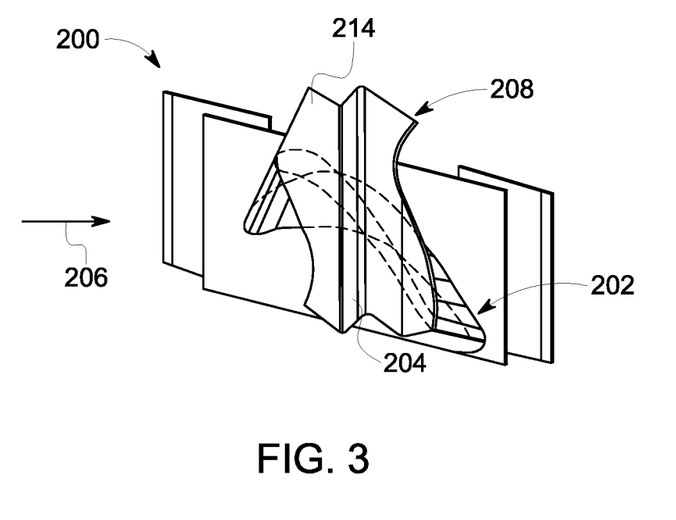

FIG. 2 is a side view of an airfoil 200 according to an embodiment. FIG. 3 is a top view of the airfoil 200 shown in FIG. 3. In embodiments, a plurality of airfoils 200 is coupled to a rotor wheel in a turbine engine assembly, such as the turbine engine system 100. The airfoil 200 includes a blade 202. In an embodiment, the blade 202 converts the energy of a hot gas flow 206 into tangential motion of the bucket, which in turn rotates the rotor to which the bucket is attached. At the top of the blade 202, a seal rail 204 is provided to prevent the passage of hot gas flow 206 through a gap between the bucket tip and the inner surface of the surrounding stationary components (not shown). As depicted, the seal rail 204 extends circumferentially from a shroud 208 located at the bucket tip. In an assembly of buckets on a rotor, the seal rail 204 extends circumferentially around a bucket row on the rotor, beyond the airfoil 200 sufficiently to line up with seal rails provided at the tip of adjacent buckets, effectively blocking flow from bypassing the bucket row so that airflow must be directed to the working length of the bucket blade 202. During operation, the bucket row and rotor rotate about rotor axis 212.

As depicted, the shroud 208 has a radially outer side 214 and a radially inner side 216. In addition, an airfoil axis 210 extends longitudinally through the blade 202. In embodiments, the shroud 208 is a flat plate supported towards its center by the blade 202, where the shroud 208 is subject to high temperatures and centrifugal loads during turbine operation. As a result, portions of the shroud 208 may experience fatigue over time, where embodiments of the modifying process described herein modify a reference location, such as to repair flaws in the airfoil shroud.

Figure 4:
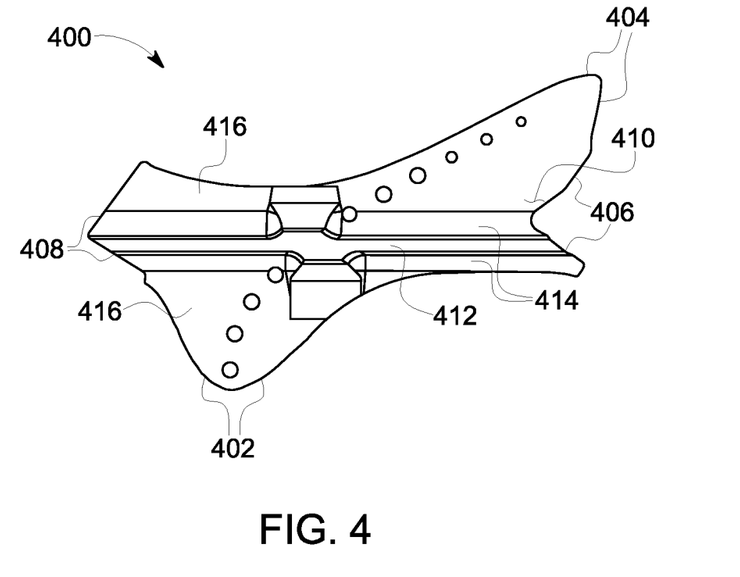

FIG. 4 is a top view of an embodiment of an airfoil shroud 400 disposed at a tip of an airfoil as described above. The airfoil shroud 400 has a leading edge 402, a trailing edge 404, a first end edge 406 and a second end edge 408 defining the shroud. A seal rail 412 extends from a radially outer side 416 of the shroud in a circumferential direction from the first end edge 406 to the second end edge 408. In a bucket row assembly for a rotor, the first end edge 406 is configured to be placed adjacent the second end edge 408 of an adjacent airfoil shroud to provide a substantially continuous circumferential seal rail assembly in the turbine stage. The circumferential seal rail assembly blocks hot gas flow (e.g., 206) from bypassing the bucket row so that flow is directed along a working length of the bucket airfoil.

The seal rail 412 has fillets 414 on each side extending from the radially outer surface 416 to provide support for the seal rail 412. During operation of the turbine engine, fatigue caused by high pressures and temperatures can cause formation of a flaw 410 in the airfoil shroud 400. In an embodiment, the flaw 410 is a crack proximate the fillet 414 of seal rail 412. In cases where the flaw 410 is proximate structural regions, such as fillets 414, a relief cut may be used to repair and remove the flaw 410, as described below. The relief cut may be formed without performing a weld process on the shroud. In contrast, processes using welding to repair flaws may adversely affect material structural regions of the airfoil shroud 400, such as fillets 414.

Figure 5:
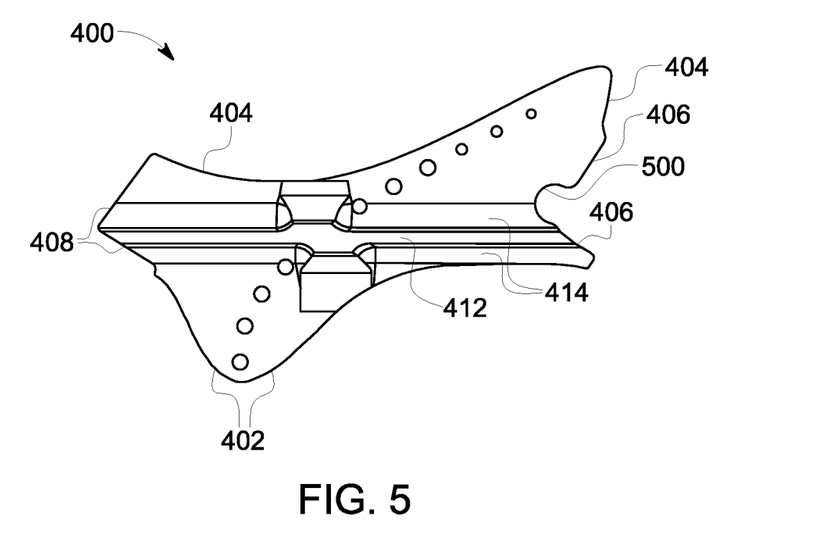

Accordingly, FIG. 5 is a top view of the airfoil shroud 400 following a modifying of the airfoil shroud. The method for modifying the airfoil shroud 400 includes locating the reference location or flaw 410 in the first end edge 406 of the shroud. The modifying also includes forming a relief cut 500 in the first end edge 406 proximate the fillet 414. In other embodiments, the relief cut 500 has any suitable geometry, such as a V-shape, parabolic, or polyhedron shape. In an embodiment, the relief cut 500 forms an arc-shaped recess. The relief cut 500 may be formed using any suitable process, such as machining or drilling, to remove material including the flaw 410 from the airfoil shroud 400. In an embodiment, the airfoil shroud 400 is made from any suitable material, such as a steel alloy, stainless steel or other alloy.

In embodiments, the modifying process repairs the airfoil shroud 400 without a welding process, thus ensuring structural integrity is maintained in the region repaired. The structural integrity provided by the relief cut 500 enables the airfoil shroud 400 to be reinstalled in the bucket row of the rotor and to withstand loads and stress caused by extreme temperatures and pressures. By forming the arc-shaped relief cut 500, the resulting geometry, including the fillet 414 and first end edge 406, maintains structural integrity to improve part life for the shroud, thus reducing operating costs for the turbine engine. In contrast, repair techniques that use a welding process may further fatigue the region being repaired. In some cases where welding is used for repair, welding may actually degrade the structural integrity of affected regions, thus leading to replacement of the entire airfoil and leading to increased operational costs. The service process utilizing the relief cut 500 may be used to repair a flaw located in any suitable location, such as second end edge 408, leading edge 402 and trailing edge 404. In embodiments where the relief cut 500 is in the first end edge 406, the relief cut 500 may remove a portion of the fillet 414 without resulting in significant structural losses. In other embodiments, the relief cut 500 is formed along a shroud edge and outside of the fillet 414. In cases where the relief cut 500 forms an arc-shaped recess, a radius of the arc may vary depending on application needs.

Figure 6:
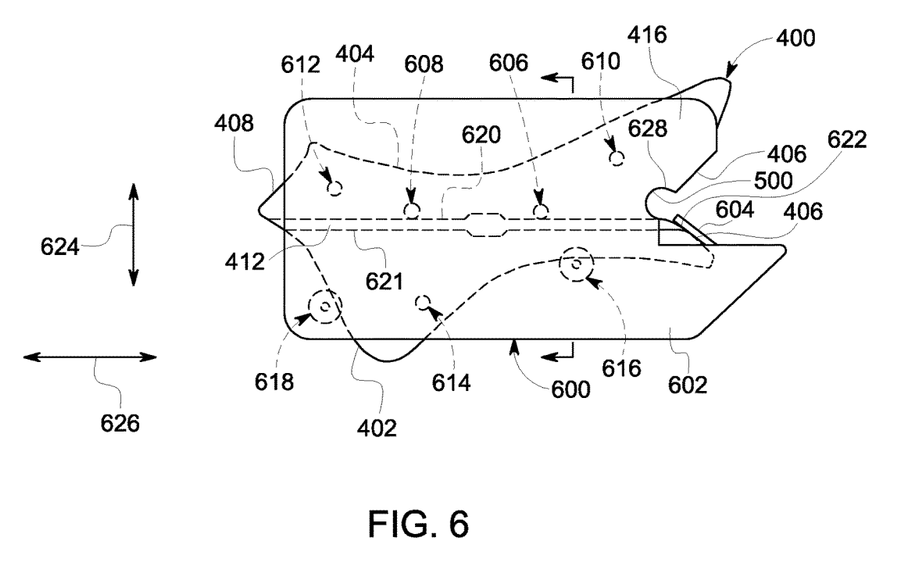
Figure 7:
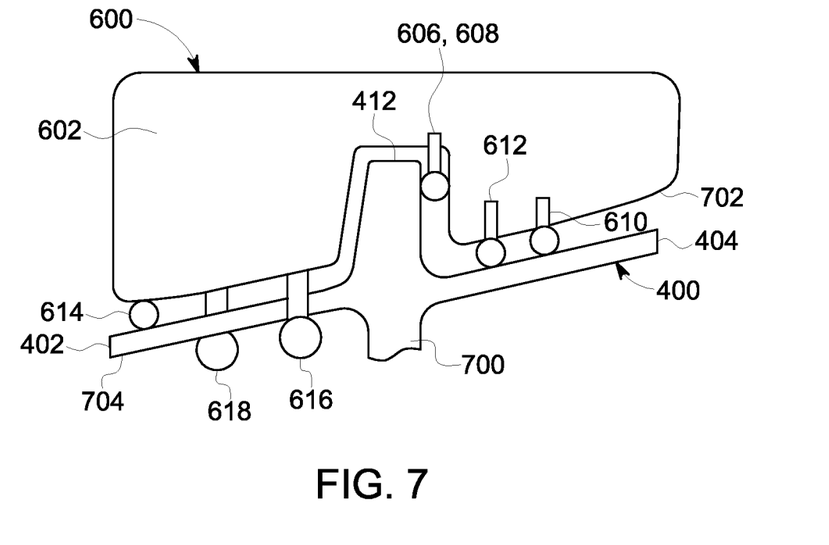

FIG. 6 is a top view of a fixture 600 used for modifying an airfoil shroud, such as the airfoil shroud 400. FIG. 7 illustrates a sectional view of the fixture 600 and airfoil shroud 400. The fixture 600 includes a base plate 602. The fixture 600 is positioned in a suitable location relative to the airfoil shroud 400 to properly locate a template for the relief cut 500 in the shroud. In one embodiment, the fixture 600 is disposed on the radially outer side 416 of the airfoil shroud 400. A locating member 604 extends from the base plate 602 to abut and locate the first end edge 406. In one embodiment, the locating member 604 is a cylindrical member that extends substantially perpendicular to an airfoil axis. In an embodiment, a side of the locating member 604 contacts a hard face surface 622 of the first end edge 406. Locating members 606 and 608 extend from the base plate 602 and abut the seal rail 412. In embodiments, the locating members 606 and 608 abut a trailing edge side 620, a leading edge side 621 or both sides of the seal rail 412. Locating members 610, 612 and 614 extend from the base plate 602 and abut the radially outer side of the airfoil shroud 400. In an embodiment, locating members 616 and 618 are located on an opposite side of the seal rail 412 from the locating members 606 and 608. Accordingly, the locating members 616 and 618 extend from the base plate 602 to contact the leading edge 402 and a radially inner side 704 of the airfoil shroud 400 to position in a direction 624 parallel to the rotor axis. The locating members 606 and 608 also position the airfoil shroud 400 in the fixture 600 with respect to direction 624. The locating members 610 and 612 contact the radially outer side 416 while locating members 616 and 618 contact radially inner side 704 to position the shroud with respect to the airfoil axis. The locating members 604 and 618 also position the airfoil shroud 400 relative to the fixture 600 in a direction 626 extending circumferentially with respect to the rotor axis. Further, in an embodiment, the locating members 616 and 618 are biased to urge the airfoil shroud toward an inner surface 702 of the base plate 602. In one embodiment, the locating members 604, 606, 608, 610, 612, 614 and 618 are cylindrical members extending from the base plate 602, where the members may be biased to urge the airfoil shroud 400 into position.

In an embodiment, the locating members 604, 606, 608, 610, 612, 614, 616, and 618 position the airfoil shroud 400 to enable a template 628 to define a geometry for the relief cut 500 in the first end edge 406 of the shroud. In an embodiment, the blade 202 (FIG. 2) is twisted and deformed over time due to exposure to high temperatures and pressures. In cases of deformation of the shroud, a service fixture based on the manufactured dimensions of the blade 202 and/or bucket base will not fit the airfoil shroud 400 and, thus, will not accurately locate the template 628. Accordingly, the depicted embodiment of fixture 600 locates the template 628 relative to the airfoil shroud 400 by positioning the fixture 600 solely based on portions of the shroud. Thus, by properly positioning the fixture 600 and template 628 relative to the airfoil shroud 400, the geometry for the relief cut 500 is accurately provided. In an embodiment, a marking device (e.g., carbide tip) is used by an operator with the template 628 to provide a mark on the airfoil relief shroud 400 for the relief cut 500, where the fixture 600 is removed after the template 628 is marked and a machining device uses the marked template for the relief cut. In other embodiments the fixture 600 may include other methods for providing the template 628 for the relief cut 500. For example, a marking device may be moveable by an operator within a template "track" provided in the base plate 602 to mark a template for the relief cut 500.

Figure 8:
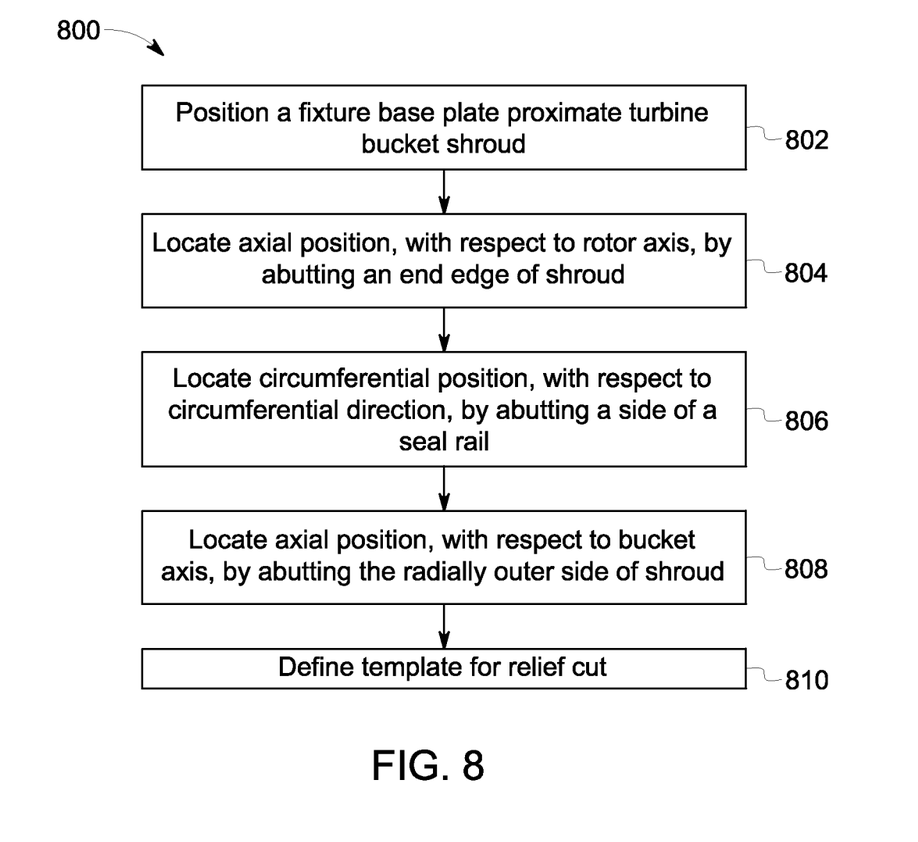

FIG. 8 is a flow chart of an exemplary process 800 for modifying an airfoil shroud 400. In a block 802, a base plate 602 of a fixture is positioned proximate the airfoil shroud 400. The base plate 602 may be positioned in any suitable location relative to the airfoil shroud 400, such as radially outside of the shroud (as depicted in FIG. 7) or circumferentially adjacent to the shroud. In block 804, an axial position, with respect to the rotor axis (e.g., 212 of FIG. 2), is located for the fixture 600 relative to the airfoil shroud 400. The axial position is located by abutting the member 604 extending perpendicular to the airfoil axis against the end edge 406. In block 806, a circumferential position, with respect to a bucket row circumference about the rotor axis, is located for the fixture 600 relative to the airfoil shroud 400. The circumferential position is located by abutting the trailing edge side 620 of seal rail 412 with the members 606, 608 extending substantially parallel to the airfoil axis. In block 808, an axial position, with respect to the airfoil axis (e.g. 210 of FIG. 2), is located for the fixture 600 relative to the airfoil shroud 400. The axial position is located by abutting the members 610, 612 extending parallel to the airfoil axis against the radially outer side 416 of the shroud. In block 810, the template 628 for the relief cut 500 is defined by the fixture 600.

The flow diagram depicted herein is just one example. There may be many variations to this diagram or the steps (or operations) described therein without departing from the spirit of the embodiment. For instance, the steps may be performed in a differing order or steps may be added, deleted or modified.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:
1. A fixture for an airfoil shroud having a first end edge, a second end edge, a leading edge, a trailing edge, a radially outer side and a radially inner side with respect to a rotor axis of a bucket having the airfoil shroud, the fixture comprising:
   a base plate configured to be disposed on one of the radially outer side and radially inner side of the airfoil shroud;

a first member extending from the base plate configured to locate and abut the first end edge, wherein the first end edge is proximate a trailing edge of an airfoil of the bucket;

a second member extending from the base plate configured to locate and abut a side of a seal rail circumferentially extending from the radially outer side of the airfoil shroud, wherein surfaces of the first end edge and the side of the seal rail are substantially parallel to an axis of the airfoil;

a third member extending from the base plate configured to locate and abut the radially outer side of the airfoil shroud; and a template recess formed in the base plate proximate the first end edge to define a geometry of a relief cut in the trailing edge of the airfoil shroud.

2. The fixture: of claim 1, wherein the base plate has an inner surface substantially parallel to the radially outer side of the airfoil shroud.

3. The fixture of claim 1, wherein the first member comprises an axial member extending from the base plate such that a side of the axial member abuts the first end edge.

4. The fixture of claim 1, wherein the template recess comprises a recess defining an edge of the base plate.

5. The fixture of claim 4, Wherein the template recess comprises an arc-shaped recess.

6. The fixture of claim 1, wherein the second member comprises a pair of members extending substantially parallel to a airfoil axis such that ends of the pair of members abut the side of the seal rail.

7. The fixture of claim 1, wherein the second member abuts a trailing edge side of the seal rail to provide positioning in a circumferential direction for the airfoil shroud.

8. The fixture of claim 7, wherein the first member provides positioning in a direction substantially parallel to the rotor axis.

9. The fixture of claim 1, wherein the third member comprises a pair of members extending axially from the base plate such that ends of the pair of members abut the radially outer side of the airfoil shroud.

10. The fixture of claim 1, further comprising:
at least one fourth member extending from the base plate configured to locate and abut the radially inner edge of the airfoil shroud.

11. The fixture of claim 10, wherein the at least one fourth member is located on an opposite side of the seal rail from the second member.

12. The fixture of claim 10, wherein the at least one fourth member is configured to locate and abut the leading edge of the airfoil shroud.

13. The fixture of claim 10, wherein the at least one fourth member is biased to urge the airfoil shroud toward an inner surface of the base plate.

14. The fixture of claim 10, wherein the at least one fourth member abuts the leading edge side of the airfoil shroud to provide positioning in a circumferential direction for the airfoil shroud.

15. The fixture of claim 10, wherein the at least one fourth member abuts the leading edge side of the airfoil shroud to provide positioning in a direction substantially parallel to the rotor axis.

16. The fixture of claim 10, wherein the at least one fourth member comprises a first fourth member and a second fourth member, the first fourth member abuts the leading, edge side of the airfoil shroud to provide positioning in a circumferential direction for the airfoil shroud, and the second fourth member abuts the leading edge side of the airfoil shroud to provide positioning in a direction substantially parallel to the rotor axis.

17. The fixture of claim 1, wherein the first member, the second member, and the third member are biased to urge the airfoil shroud into position.

18. The fixture of claim 10, wherein the first member, the second member, the third member, and the at least one fourth member are biased to urge the airfoil shroud into position.

* * * * *